United States Patent
El Sherif et al.

(10) Patent No.: US 11,882,840 B1
(45) Date of Patent: Jan. 30, 2024

(54) FOLIAR SPRAYING OF CURCUMA LONGA PLANTS WITH CHLORELLA VULGARIS ALGAE AQUATIC EXTRACT IMPROVED GROWTH AND CURCUMINOID ACCUMULATION

(71) Applicant: KING FAISAL UNIVERSITY, Al-Ahsa (SA)

(72) Inventors: Fadia El Sherif, Al-Ahsa (SA); Salah Khattab, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/210,915

(22) Filed: Jun. 16, 2023

(51) Int. Cl.
- A01N 65/03 (2009.01)
- A01P 21/00 (2006.01)
- A01N 25/04 (2006.01)

(52) U.S. Cl.
CPC ............. *A01N 65/03* (2013.01); *A01N 25/04* (2013.01); *A01P 21/00* (2021.08)

(58) Field of Classification Search
CPC .......... A01N 65/03; A01N 25/04; A61P 21/00
See application file for complete search history.

(56) References Cited

PUBLICATIONS

Al Dayel et al., "Evaluation of the effects of Chlorella vulgaris, Nannochloropsis salina, and Enterobacter cloacae on growth, yield and active compound compositions of Moringa oleifera under salinity stress", Saudi Journal of Biological Sciences, vol. 28, Issue 3, Mar. 2021, pp. 1687-1696.

Hajnal-Jafari et al., "Effect of Chlorella vulgaris on Growth and Photosynthetic Pigment Content in Swiss Chard (*Beta vulgaris* L. subsp. *cicla*)", Pol J Microbiol. Jun. 2020; 69(2): 235-238.

Park et al., "Effect of Chlorella vulgaris on the Growth and Phytochemical Contents of "Red Russian" Kale (*Brassica hapus* var. *Pabularia*)", Agronomy 2022, 12(9), 2138.

Tian et al., "Effects of Chlorella extracts on growth of *Capsicum annuum* L. seedlings", Scientific Reports vol. 12, Article No. 15455 (2022).

Kusvuran, "Microalgae (*Chlorella vulgaris* Beijerinck) alleviates drought stress of broccoli plants by improving nutrient uptake, secondary metabolites, and antioxidative defense system", Horticultural Plant Journal, vol. 7, Issue 3, May 2021, pp. 221-231.

Allaguvatova et al., "A simple method for the cultivation of algae *Chlorella vulgaris* Bejerinck", IOP Conf. Series: Earth and Environmental Science 390 (2019).

Ozdemir et al., "Production of Chlorella vulgaris and its effects on plant growth, yield and fruit quality of organic tomato grown in greenhouse as biofertilizer", Jan. 2016, Tarim Bilimleri Dergisi 22(4):596-605.

Hajnal-Jafari et al., "Influence of green algae *Chlorella vulgaris* on initial growth of different agricultural crops", Jan. 2016, Zbornik Matice srpske za prirodne nauke 2016(130):29-33.

*Primary Examiner* — Ali Soroush
(74) *Attorney, Agent, or Firm* — Nath, Goldberg & Meyer; Richard C. Litman

(57) ABSTRACT

*Chlorella vulgaris* aqueous extracts are used for enhancing *C. longa* plant growth and rhizome yield. In *C. longa*, *Chlorella vulgaris* foliar spraying stimulates plant growth and yield, as well as changing the compositions of bioactive compounds. Plant growth, yield, photosynthetic pigment concentration, and nitrogen content all improved when the *Chlorella vulgaris* aqueous extract was added to the foliar spray. The CURS-1, -2, -3, and DCS genes were revealed to be differently upregulated by the *Chlorella vudgaris* aqueous extract treatments. The curcuminoid content (hisdenethoxycurcumin, dimethoxycurcumin, and curcumin) also increased when the plant was sprayed with the *Chlorella vulgaris* aqueous extract, which corresponded with the curcuminoid gene's expression level.

17 Claims, 2 Drawing Sheets
Specification includes a Sequence Listing.

FOLIAR SPRAYING OF CURCUMA LONGA PLANTS WITH CHLORELLA VULGARIS ALGAE AQUATIC EXTRACT IMPROVED GROWTH AND CURCUMINOID ACCUMULATION

BACKGROUND

Sequence Listing

The instant application contains a Sequence Listing which has been submitted in XML format via the USPTO's Patent Center and is hereby incorporated by reference in its entirety. Said XML copy, created on Jun. 8, 2023, is named 33101_51U_Sequence_Listing.xml and is 9,465 bytes in size.

1. FIELD

The disclosure of the present patent application relates to the use of *Chlorella vulgaris* as a good elicitor for enhancing *C. longa* plant growth and rhizome yield.

2. DESCRIPTION OF THE RELATED ART

The overuse of synthetic chemical fertilizers may affect the environment. As a result, various sources, particularly biofertilizers, have been recommended to replace chemical fertilizers in part or entirely. These biofertilizers are both inexpensive and environmentally benign.

Because of the unavoidable need to protect the environment and combat the negative impacts of climate change on agriculture, plant extracts and algae have been widely reintroduced as a means of increasing agricultural yields as well as preventing and treating plant illnesses. *Chlorella vulgaris* has numerous growth promoters and has played an important role in establishing and maintaining soil fertility.

*Curcuma longa* L. (turmeric) is a Zingiberaceae family perennial herbaceous plant. Rhizomes are the most commonly used plant component and contain a variety of compounds, including bioactive non-volatile curcuminoids (curcumin, dimethoxy- and bisdemethoxycurcumin) and volatile oil molecules (mono- and sesqui-terpenoids). Curcuminoids, particularly curcumin, are the most important bioactive ingredients in turmeric, with antioxidant, anticancer, anti-inflammatory, anti-acidogenic, radioprotective, and neuroprotective properties.

Thus, new products and methods for enhancing curcuminoid growth and yield solving the aforementioned problems are desired.

SUMMARY

The present subject matter relates to an aquatic extract of *Chlorella vulgaris* as a foliar spray for the *curcuma* plant, and its ability to increase growth, yield, and curcuminoid component levels.

In particular, *Chlorella vulgaris* appears to be a good elicitor for enhancing *C. longa* plant growth and rhizome yield. For *C. longa*, a *Chlorella vulgaris* aqueous extract foliar spray can stimulate plant growth and yield, as well as change the compositions of bioactive compounds. Plant growth, yield, photosynthetic pigment concentration, and nitrogen content can all improve when an aqueous extract of *Chlorella vulgaris* is used in a foliar spray on *C. longa*. Further, the CURS-1, -2, -3, and DCS genes of *C. longa* can be differently upregulated by treatment with an aqueous extract of *Chlorella vulgaris*. The curcuminoid content (for example, bisdemethoxycurcumin, dimethoxycurcumin, and curcumin) can increase when the *C. longa* plant is sprayed with the present *Chlorella vulgaris* aqueous extract, which corresponds with the curcuminoid gene's expression level.

In an embodiment, the present subject matter relates to a method of preparing a *Chlorella vulgaris* aqueous extract, the method comprising: grinding a *Chlorella vulgaris* powder in cold water to obtain a *Chlorella vulgaris* paste; centrifuging the *Chlorella vulgaris* paste in a refrigerated centrifuge; obtaining a clear supernatant; and adding cold water to the clear supernatant to obtain the *Chlorella vulgaris* aqueous extract.

In another embodiment, the present subject matter relates to a *Chlorella vulgaris* aqueous extract prepared according to the methods as described herein.

In a further embodiment, the present subject matter relates to a method for enhancing *Curcuma longa* plant growth and rhizome yield, the method comprising: spraying a composition comprising the *Chlorella vulgaris* aqueous extract as described herein onto foliage of the *Curcuma longa* plant.

These and other features of the present subject matter will become readily apparent upon further review of the following specification.

DETAILED DESCRIPTION OF THE PREFERRED EMBODIMENTS

Figure 1:
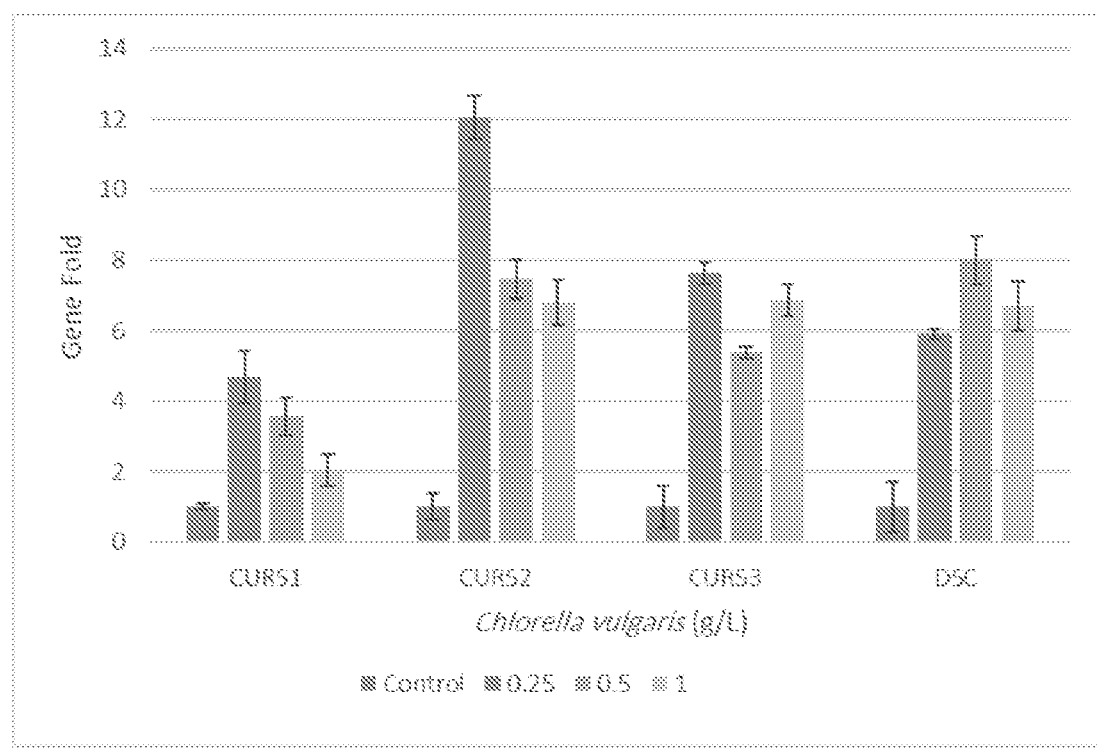
FIG. 1 depicts a chart showing differential expression profiling of curcuminoid synthase genes, CURS1, CURS2, CURS3, and DCS in *C. longa* rhizomes from control and *C. vulgaris* (0.25, 0.5 and 1 g/l) treated plants.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

As used herein, "CURS1", "CURS2", and "CURS3", refer to Curcumin synthase 1 (CURS-1), Curcumin synthase 2 (CURS-2), and Curcumin synthase 3 (CURS-3).

As used herein, "DCS" refers to Diketide-CoA synthase.

*Chlorella vulgaris* appears to be a good elicitor for enhancing *Curcuma longa* (*C. longa*) plant growth and rhizome yield. For *C. longa*, a *Chlorella vulgaris* aqueous extract foliar spray can stimulate plant growth and yield, as well as change the compositions of bioactive compounds. Plant growth, yield, photosynthetic pigment concentration, and nitrogen content can all improve when an aqueous extract of *Chlorella vulgaris* is used in a foliar spray on *C. longa*. Further, the CURS-1, -2, -3, and DCS genes of *C. longa* can be differently upregulated by treatment with an aqueous extract of *Chlorella vulgaris*. The curcuminoid content (for example, bisdemethoxycurcumin, dimethoxycurcumin, and curcumin) can increase when the *C. longa* plant is sprayed with the present *Chlorella vulgaris* aqueous extract, which corresponds with the curcuminoid gene's expression level.

In an embodiment, the present subject matter relates to a method of preparing a *Chlorella vulgaris* aqueous extract, the method comprising: grinding a *Chlorella vulgaris* powder in cold water to obtain a *Chlorella vulgaris* paste; centrifuging the *Chlorella vulgaris* paste in a refrigerated centrifuge; obtaining a clear supernatant; and adding cold water to the clear supernatant to obtain the *Chlorella vulgaris* aqueous extract.

In this regard, the cold water in the step of grinding the *Chlorella vulgaris* powder in cold water can have a temperature of about 4° C. In other embodiments, the cold water can have a temperature of above the freezing point of water, or above 0° C., and below the room temperature of water, or below about 25° C. In certain embodiments, the cold water can have a temperature of about 4° C. to about 15° C. Further, this grinding step can be conducted for at least about 1 minute, or longer. In a non-limiting embodiment, about 0.25 to about 1 g, or about 0.25, about 0.5, or about 1 g of the *Chlorella vulgaris* powder can be ground.

In another embodiment, the centrifuging step can be conducted at about 8000 rpm for at least about 10 minutes and at a temperature of about 4° C. Further, this centrifuging step can be conducted for at least about 10 minutes, or longer.

In a further embodiment, the clear supernatant can be collected in separate volumetric flasks, with cold water, as described herein, used to "top up" the volume in each flask to a level of about 1 L. This results in a *Chlorella vulgaris* aqueous extract having a concentration of about 0.25 to about 1 g/L, or of about 0.25, about 0.5, or about 1 g/L.

In another embodiment, the present subject matter relates to a *Chlorella vulgaris* aqueous extract prepared according to the methods as described herein. Similarly, the present subject matter relates to a *Chlorella vulgaris* aqueous extract, whether prepared according to the present methods or otherwise.

In this regard, in an embodiment, the *Chlorella vulgaris* aqueous extract is made using *Chlorella vulgaris* powder. The composition of such powder can be determined by methanol extraction, as discussed in more detail in the examples, below.

In a further embodiment, the present subject matter relates to a method for enhancing *Curcuma longa* plant growth and rhizome yield, the method comprising: spraying a composition comprising the *Chlorella vulgaris* aqueous extract as described herein onto foliage of the *Curcuma longa* plant. The *Curcuma longa* plant growth and rhizome yield, as well as the other beneficial effects on the *Curcuma longa* plant described herein, are achievable regardless of whether the *Chlorella vulgaris* aqueous extract is prepared according to the present production methods or otherwise.

In an embodiment, the composition used in the present enhancement methods can comprise about 0.25, about 0.5, or about 1 g/L of the *Chlorella vulgaris* aqueous extract. In other embodiments, the composition can further comprise a surfactant.

In an embodiment, in use, the composition can be sprayed onto the foliage of the *Curcuma longa* plant three times over a one hour period in a morning at two-month intervals. In this regard, each spray can comprise about 50 mL of the composition.

In certain embodiments, the enhancement method can increase bisdemethoxycurcumin, demethoxycurcumin, and curcumin accumulation from the *Curcuma longa* plant. By way of non-limiting example, the enhancement method can increase bisdemethoxycurcumin, demethoxycurcumin, and curcumin accumulation from the *Curcuma longa* plant by at least about 95%, at least about 100%, and at least about 68%, respectively. In other embodiments, the enhancement method can increase height of the *Curcuma longa* plant. Similarly, the enhancement method can increase leaf production of the *Curcuma longa* plant.

In further embodiments, the enhancement method can increase expression of Curcumin synthase 1 (CURS-1), Curcumin synthase 2 (CURS-2), Curcumin synthase 3 (CURS-3), and Diketide-CoA synthase (DCS) genes in the *Curcuma longa* plant. By way of non-limiting example, the enhancement method can increase expression of Curcumin synthase 1 (CURS-1), Curcumin synthase 2 (CURS-2), Curcumin synthase 3 (CURS-3), and Diketide-CoA synthase (DCS) genes in the *Curcuma longa* plant by at least about 50%, at least about 600%, at least about 600%, and at least about 600%, respectively.

The present teachings are illustrated by the following examples.

EXAMPLES

Example 1

*Chlorella vulgaris* Powder Composition

The contents of the *Chlorella vulgaris* powder were determined by GC/MS analysis. The GC/MS analyses of

*Chlorella vulgaris* were performed at the Department of Clinical Studies, College of Veterinary Medicine, King Faisal University. *Chlorella vulgaris* powder was extracted with methanol, according to the procedures described by McKennedy et al., "Supercritical Carbon dioxide Treatment of the Microalgae *Nannochloropsis oculata* for the production of Fatty Acid Methy Esters", The Journal of Supercritical Fluids, Volume 116, October 2016, Pages 264-2710, the contents of which are hereby incorporated by reference in their entirety. The methanol extracts were analysed by gas chromatography coupled with mass Spectrometry (GC/MS-QP 2010 Plus).

The phytochemical composition of methanol extracts from *Chlorella vulgaris* as determined by GC MS are summarized in Table 1.

TABLE 1

| Algae species | RT | Area % | MW | Compound Name |
|---|---|---|---|---|
| *Chlorella vulgaris* | 7.694 | 4.2 | C2H3NO | Isocyanic acid, methyl ester |
| | 17.391 | 5.9 | C5H10O2 | Capric acid methyl ester |
| | 18.764 | 1.12 | C8H6N2O4 | p,.beta.-Dinitrostyrene |
| | 19.402 | 18.2 | C17H32O2 | 9-Hexadecenoic acid, methyl ester, (Z)- $$ Methyl palmitoleate |
| | 19.628 | 63.3 | C17H34O2 | Palmitic acid, methyl ester |
| | 21.495 | 1.50 | C5H6O2 | Vinyl acrylate |
| | 21.825 | 083 | C11H17N3O | p-Mentha-6,8-dien-2-one, semicarbazone |
| | 22.008 | 0.4 | C7H4F3NO3 | p-Cresol, 2-nitro-.alpha... lpha...alpha.-trifluor |
| | 22.326 | 5.5 | C14H9Cl2NO | 2H-Indol-2-one, 1-(2,6. dichlorophenyl)-1,3-dihydro |

Example 2

Preparation of *C. vulgaris* Aqueous Extract

*Chlorella vulgaris* powder was purchased from Earth Circle Organics (USA). *C. vulgaris* powder (0.25, 0.5 and 1 g) was separately ground in 50 mL of cold (4° C.) deionized water using a mortar and pestle for 1 min. The *C. vulgaris* paste from the three preparations were then centrifuged in a refrigerated centrifuge for 10 min at 8000× g and at 4° C. The clear supernatant from each preparation (0.25, 0.5 and 1 g) was collected into three separate volumetric flasks (1 L) The volume in each flask was top up to 1 L using cold distilled water to obtain the corresponding *C. vulgaris* at 0.25, 0.5 and 1 g/L concentrations.

Example 3

Plant Material and Growth Conditions

The experiment was conducted under greenhouse conditions in 2022 at the Agriculture and Veterinary Research and Training Center, King Faisal University, Al-Ahasa, Saudi Arabia. Turmeric rhizomes (Agriculture and Veterinary Research and Training Center, King Faisal University, Saudi Arabia) were shown on 1 Apr. 2022. Germination was carried out by, sowing rhizomes in trays (depth of 1-2 cm) filled with a moist mixture of sand and peat moss (1:1 v:v). Turmeric seedlings, 5 cm tall and with three pairs of leaves, were transplanted into sandy soil and placed 40 cm×40 cm from each other. Each plot was 120 cm×160 cm (19.20 m$^2$), with 20 plants in each plot and 10 replicates of each treatment.

The study used distilled water as a control and three concentrations of *C. vulgaris* (0.25, 0.5 and 1 g/L) as treatment groups. *C. vulgaris* solutions containing the surfactant (0.1 percent triton) were sprayed on the entire foliage three times in the morning (8-9 a.m.) at two-month intervals. The volume of sprayed solution per plant was roughly 50 ml, each time. The control plants received the same amount of deionized water plus 0.1 percent Triton as the experimental plants.

After eight months of cultivation, the whole plant was harvested, and the plant height (cm), number of leaves (n), number of roots and rhizomes/plant (n), dry weight of the leaves, roots and rhizomes/plant (g) and rhizome diameter (mm) were recorded using 10 random plants from each treatment group.

Example 4

Measurement of Photosynthetic Pigments and Mineral Composition

A fresh leaf located third from the bottom of each of six randomly selected eight-month-old turmeric plants was removed. The amounts of chlorophyll a and b, as well as carotenoid, were measured using an Agilent 8453 UV-visible spectrophotometer (Agilent Technologies. Santa Clara, CA, USA). 240 days after planting, plant leaves from various treatments were dried for 48 hours at 60° C. and degraded with Sulfuric acid. The nitrogen content was determined using the modified micro-Kjeldahl technique. Calorimetry was employed to assess the phosphorus content, and atomic absorption flame photometry was utilized to evaluate the potassium (K) levels. At the completion of the experiment, soil samples were gathered and analyzed.

Foliar spraying with *Chlorella vulgaris* increased the plant growth parameters, rhizome yield and photosynthetic pigments in *C. longa* plants compared to the control treatment. *Chlorella vulgaris* at 0.25 g/L had the most favorable effect on the plant height, number of leaves, dry weight of the root and N contents in the leaves, which correlated with the highest rhizome number, rhizome dry weight and rhizome diameter.

Example 5

Determination of Curcumin, Bisdemethoxycurcumin and Demethoxycurcumin Contents in Ethanolic Extracts of Dried *C. longa* Rhizome by High-Performance Liquid Chromatography (HPLC)

The contents of curcumin, bisdemethoxycurcumin. and demethoxycurcumin in air-dried *C. longa* rhizomes powder from three plants randomly chosen from each treatment (control and 0.25, 0.5, and 1 g/l *C. vulgaris*) were determined using a Waters 2690 Alliance HPLC system (Waters, Milford. MA, USA) equipped with a Waters 996 photodiode array detector (Waters, Milford, MA, USA) and a C18 Inertsil (4.6 mm, 250 mm, 5 m) column.

Figure 2:
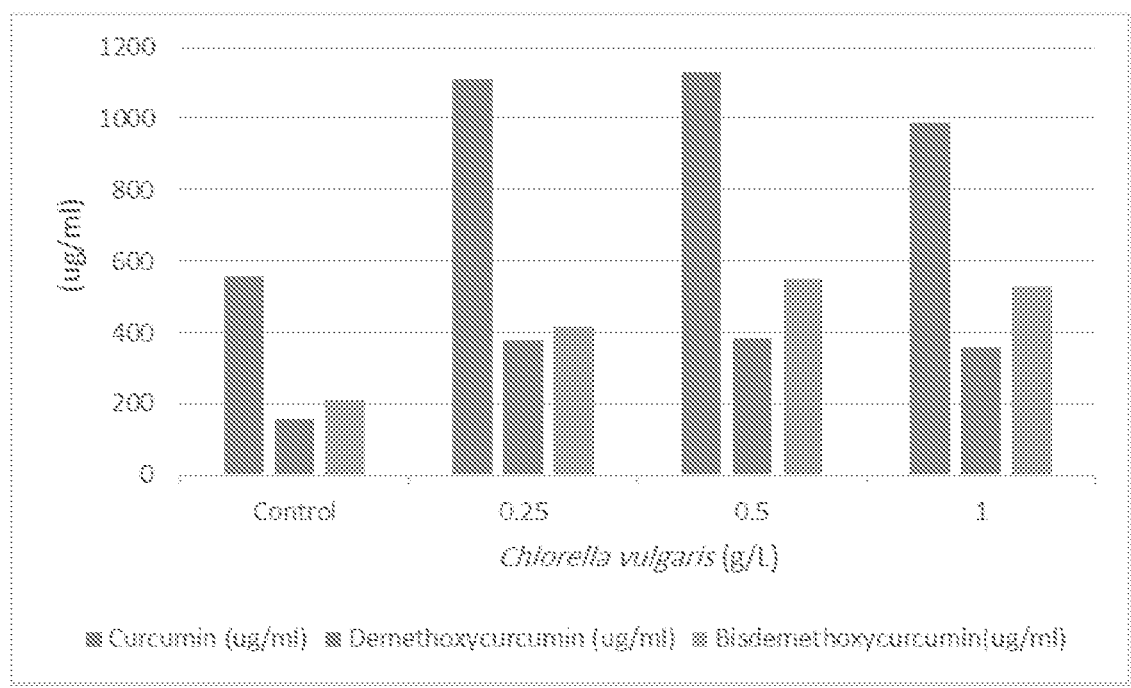
FIG. 2 depicts a chart showing effects of *C. vulgaris* treatments on bisdemethoxycurcumin, demethoxycurcumin and curcumin (µg/ml) accumulation of *C. longa*.

The effects of *C. vulgaris* treatments on bisdemethoxycurcumin, demethoxycurcumin, and curcumin (µg/ml) accumulation of *C. longa* are exhibited in FIG. 2.

Example 6

Analysis of CURS-1, -2, -3 and DCS Gene Expression by Real-Time Reverse Transcriptase Polymerase Chain Reaction (Real-Time RT-PCR)

The transcript levels of curcuminroid genes (Table 2) were determined using Real-Time RT-PCR in *C. longa* rhizomes from four 240-day-old plants chosen at random from each experimental group (control and 0.25, 0.5 and 1 g/L *C. vulgaris*). Table 2 shows the sequences of forward and reverse primers for real-time RT-PCR.

TABLE 2

| Gene | Primers Sequence | Amplicon Length (bp) | GenBank Accession Number |
| --- | --- | --- | --- |
| Diketide-CoA synthase (DCS) | 5'-GTGCTGTTCATCCTGGACGAG-3' (forward) (SEQ ID NO: 1)<br>5'-CAACAGCACGCCCCAGTCGA-3' (reverse) (SEQ ID NO: 2) | 21<br>20 | AB495006.1 |
| Curcumin synthase 1 (CURS-1) | 5'-CATCATTGACGCCATCGAAGC-3' (forward) (SEQ ID NO: 3)<br>5'-TCAGCTCATCCATCACGAAGTACAC-3' (reverse) (SEQ ID NO: 4) | 21<br>25 | AB495007.1 |
| Curcumin synthase 2 (CURS-2) | 5'-TCGGGATCAAGGACTGGAACAAC-3' (forward) (SEQ ID NO: 5)<br>5'-TGTTGCCGAACTCGGAGAAGAC-3' (reverse) (SEQ ID NO: 6) | 23<br>22 | AB506762.1 |
| Curcumin synthase 3 (CURS-3) | 5'-TGGAGCCCTCCTTCGACGACC-3' (forward) (SEQ ID NO: 7)<br>5'-CCCATTCCTTGATCGCCTTTTCC-3' (reverse) (SEQ ID NO: 8) | 21<br>23 | AB506763.1 |
| Actin | 5'-GGATATGCTCTTCCTCATGCT-3' (forward) (SEQ ID NO: 9)<br>5'-TCTGCTGTGGTGGTGAATGA-3' (reverse) (SEQ ID NO: 10) | 21<br>20 | CP002686.1<br>AK118354.1<br>AY087740.1 |

The differential expression profiling of curcuminoid synthase genes, CURS1, CURS2, CURS3 and DCS, in *C. longa* rhizome from control and *C. vulgaris* (0.25, 0.5, and 1 g/L) treated plants are shown in FIG. 1. Data were normalized using Actin as an internal reference gene.

It is to be understood that the use of *Chlorella vulgaris* as a good elicitor for enhancing *C. longa* plant growth and rhizome yield is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of preparing a *Chlorella vulgaris* aqueous extract, the method comprising:
   grinding a *Chlorella vulgaris* powder in cold water to obtain a *Chlorella vulgaris* paste;
   centrifuging the *Chlorella vulgaris* paste in a refrigerated centrifuge;
   obtaining a clear supernatant; and
   adding cold water to the clear supernatant to obtain the *Chlorella vulgaris* aqueous extract.

2. The method of claim 1, wherein the cold water in the step of grinding the *Chlorella vulgaris* powder in cold water has a temperature of about 4° C.

3. The method of claim 1, wherein the centrifuging step is conducted at about 8000 rpm for at least about 10 minutes and at a temperature of about 4° C.

4. The method of claim 1, wherein the *Chlorella vulgaris* aqueous extract has a concentration of about 0.25 to about 1 g/L.

5. The method of claim 4, wherein the *Chlorella vulgaris* aqueous extract has a concentration of about 0.25, about 0.5, or about 1 g/L.

6. A *Chlorella vulgaris* aqueous extract prepared according to the method of claim 1.

7. A method for enhancing *Curcuma longa* plant growth and rhizome yield, the method comprising:
   spraying a composition comprising the *Chlorella vulgaris* aqueous extract of claim 6 onto foliage of the *Curcuma longa* plant.

8. The method of claim 7, wherein the composition comprises about 0.25, about 0.5, or about 1 g/L of the *Chlorella vulgaris* aqueous extract.

9. The method of claim 7, wherein the composition further comprises a surfactant.

10. The method of claim 7, wherein the composition is sprayed onto the foliage of the *Curcuma longa* plant three times over a one hour period in a morning at two-month intervals.

11. The method of claim 7, wherein each spray comprises about 50 mL of the composition.

12. The method of claim 7, wherein the method increases bisdemethoxycurcumin, demethoxycurcumin, and curcumin accumulation from the *Curcuma longa* plant.

13. The method of claim 12, wherein the method increases bisdemethoxycurcumin, demethoxycurcumin, and curcumin accumulation from the *Curcuma longa* plant by at least about 95%, at least about 100%, and at least about 68%, respectively.

14. The method of claim 7, wherein the method increases height of the *Curcuma longa* plant.

15. The method of claim 7, wherein the method increases leaf production of the *Curcuma longa* plant.

16. The method of claim 7, wherein the method increases expression of Curcumin synthase 1 (CURS-1), Curcumin synthase 2 (CURS-2), Curcumin synthase 3 (CURS-3), and Diketide-CoA synthase (DCS) genes in the *Curcuma longa* plant.

17. The method of claim 16, wherein the method increases expression of Curcumin synthase 1 (CURS-1), Curcumin synthase 2 (CURS-2), Curcumin synthase 3 (CURS-3), and Diketide-CoA synthase (DCS) genes in the *Curcuma longa* plant by at least about 50%, at least about 600%, at least about 600%, and at least about 600%, respectively.

* * * * *

SEQUENCE LISTING

```
Sequence total quantity: 10
SEQ ID NO: 1            moltype = DNA  length = 21
FEATURE                 Location/Qualifiers
source                  1..21
                        mol_type = genomic DNA
                        organism = Curcuma longa
SEQUENCE: 1
gtgctgttca tcctggacga g                                                21
```

| | | |
|---|---|---|
| SEQ ID NO: 2<br>FEATURE<br>source<br><br>SEQUENCE: 2 | moltype = DNA   length = 20<br>Location/Qualifiers<br>1..20<br>mol_type = genomic DNA<br>organism = Curcuma longa | |
| caacagcacg ccccagtcga | | 20 |
| SEQ ID NO: 3<br>FEATURE<br>source<br><br>SEQUENCE: 3 | moltype = DNA   length = 21<br>Location/Qualifiers<br>1..21<br>mol_type = genomic DNA<br>organism = Curcuma longa | |
| catcattgac gccatcgaag c | | 21 |
| SEQ ID NO: 4<br>FEATURE<br>source<br><br>SEQUENCE: 4 | moltype = DNA   length = 25<br>Location/Qualifiers<br>1..25<br>mol_type = genomic DNA<br>organism = Curcuma longa | |
| tcagctcatc catcacgaag tacac | | 25 |
| SEQ ID NO: 5<br>FEATURE<br>source<br><br>SEQUENCE: 5 | moltype = DNA   length = 23<br>Location/Qualifiers<br>1..23<br>mol_type = genomic DNA<br>organism = Curcuma longa | |
| tcgggatcaa ggactggaac aac | | 23 |
| SEQ ID NO: 6<br>FEATURE<br>source<br><br>SEQUENCE: 6 | moltype = DNA   length = 22<br>Location/Qualifiers<br>1..22<br>mol_type = genomic DNA<br>organism = Curcuma longa | |
| tgttgccgaa ctcggagaag ac | | 22 |
| SEQ ID NO: 7<br>FEATURE<br>source<br><br>SEQUENCE: 7 | moltype = DNA   length = 21<br>Location/Qualifiers<br>1..21<br>mol_type = genomic DNA<br>organism = Curcuma longa | |
| tggagccctc cttcgacgac c | | 21 |
| SEQ ID NO: 8<br>FEATURE<br>source<br><br>SEQUENCE: 8 | moltype = DNA   length = 23<br>Location/Qualifiers<br>1..23<br>mol_type = genomic DNA<br>organism = Curcuma longa | |
| cccattcctt gatcgccttt tcc | | 23 |
| SEQ ID NO: 9<br>FEATURE<br>source<br><br>SEQUENCE: 9 | moltype = DNA   length = 21<br>Location/Qualifiers<br>1..21<br>mol_type = genomic DNA<br>organism = Curcuma longa | |
| ggatatgctc ttcctcatgc t | | 21 |
| SEQ ID NO: 10<br>FEATURE<br>source<br><br>SEQUENCE: 10 | moltype = DNA   length = 20<br>Location/Qualifiers<br>1..20<br>mol_type = genomic DNA<br>organism = Curcuma longa | |
| tctgctgtgg tggtgaatga | | 20 |